United States Patent [19]

Lalancette

[11] 4,277,596

[45] Jul. 7, 1981

[54] CALCINED POLYHYDROXYSILICATE POLYMER REACTION PRODUCT

[75] Inventor: Jean M. Lalancette, Sherbrooke, Canada

[73] Assignee: Societe Nationale de l'Amiante, Quebec, Canada

[21] Appl. No.: 138,451

[22] Filed: Apr. 8, 1980

[51] Int. Cl.³ .................... C08G 59/14; C08G 8/28
[52] U.S. Cl. ................. 528/106; 260/37 EP; 260/38; 528/92; 528/129; 528/140; 528/155; 528/406
[58] Field of Search .............. 260/37 EP, 38; 528/92, 528/106, 129, 140, 155, 406

[56] References Cited

U.S. PATENT DOCUMENTS

| | | | |
|---|---|---|---|
| 2,999,833 | 9/1961 | Bleuenstein | 260/38 |
| 3,061,577 | 10/1962 | Pruett | 260/41 |
| 3,215,494 | 11/1965 | Hemstock | 23/110 |
| 3,470,128 | 9/1969 | Ernst et al. | 260/37 |
| 3,478,300 | 7/1973 | Lalancette | 260/38 |
| 3,755,067 | 8/1973 | Schnabel | 161/262 |
| 4,192,707 | 3/1980 | Glass et al. | 162/3 |

OTHER PUBLICATIONS

Axelson, "Asbestos as a Reinforcement and Filler in Plastics", *Advances in Chemistry Series*, No. 134, pp. 16–22, Amer. Chem. Soc. 1974.

*Primary Examiner*—Earl A. Nielsen

[57] ABSTRACT

There is provided a molded shaped structure made by molding the reaction product of an organic resin and a modified magnesium silicate obtained by calcining chrysotile asbestos tailings. The new product is characterized by the absence of any fibers.

9 Claims, No Drawings

CALCINED POLYHYDROXYSILICATE POLYMER REACTION PRODUCT

The present invention relates to a novel shaped structure made from the moulding of the reaction product of a modified magnesium silicate and an organic resin.

BACKGROUND OF THE INVENTION

The production of shaped structure from polymer is a very basic technology calling for the use of an organic resin acting as a binder in conjunction with a filler, the shaped structure being formed by one of the many techniques for molding. To this purpose, there is a great variety of organic resins used commercially. Phenolic resins and epoxy resins have been found to be most suitable because they do not require the use of coupling agents.

It is a current practice to use fillers in conjunction with resins in order to lower the cost of the end product. Normally, the filler is an inert material such as calcium carbonate or silica. It has been established previously that it is interesting, in terms of physical properties, to use a filler which is chemically bonded to the resin (U.S. Pat. No. 3,748,300). In that fashion, a more resistant product is obtained with less resin. To that effect, polyhydroxysilicate material can be used with advantage and represent a very cheap and abundant source of filler. One of the polyhydroxysilicate reported as having interesting properties as filler, in conjunction with epoxy or phenolic resins, is serpentine rejected from asbestos production. This material has the general formula $3MgO.2SiO_2.2H_2O$. It also contains from 5 to 10% of iron, and a substantial amount, up to 20%, or short asbestos fibers. In fact, in many hydroxysilicates such as serpentinite rocks, talc, mica or phlogopite, there is a small but measurable amount of asbestos fibers which render the use of such material as filler in plastics, objectionable on the basis of environmental considerations. It is well established now that the emission of asbestos fibers must be avoided whenever it is possible, and when present, the emission of asbestos fibers should be less than 2 fiber per cubic centimeter of ambient air.

Because of such environmental considerations, the use of polyhydroxysilicate, particularly of asbestos tailings of serpentinic nature, although of great technical and economical interest, becomes unpractical because of adverse environmental impact.

The release of asbestos fibers in products prepared by reacting said asbestos fibers or residues with epoxy or phenolic resins take place upon use or when the molded products must be machine-worked such as drilling for holes or sanding for smoothness or for other reasons. In these cases the asbestos fiber count per cubic centimeter is sometimes as high as twenty times the minimum prescribed by the legislation of most countries. This fact alone eliminates the possibility of using asbestos fibers or residues with epoxy or phenolic resins in the preparation of moulded shaped structures.

Since the asbestos residues constitute by themselves a great hazard to the environment it would appear from the above that they could not be used for the purpose of preparing shaped structures. On the other hand, since asbestos residues constitute a readily available and inexpensive source of raw material, it would appear to be a great advantage if a way could be found to use such asbestos residues for the preparation of shaped structures while overcoming the problem of fiber emission during subsequent machine-working of shaped structures made therefrom.

On the other hand, the prior art has always suggested that the presence of fibers was an essential feature of asbestos tailings for the manufacture of structured reaction products with hydroxy-containing polymers. Accordingly, since on one hand the presence of fibers was deemed essential, and on the other hand, the presence of the same fibers constituted an environmental hazard, it appears that asbestos tailings cannot be used in the commercial production of molded products made by the reaction of asbestos tailings and hydroxy-containing polymers.

Nevertheless, it would appear desirable to find a method which could overcome the drawbacks of fiber emission in reaction products of asbestos tailings and hydroxy-containing polymers, thus providing a useful way of using some of the immense reserves of asbestos tailings.

SUMMARY OF THE INVENTION

In accordance with the present invention, it has now been found that the disadvantages of using asbestos tailings or fibers can be readily overcome by submitting same to calcination before reacting the calcined product with an organic resin under heat and pressure to form a novel molded product.

It is known that in the thermal treatment of asbestos tailings there is a loss of water thereby providing a new chemical entity which is a magnesium silicate known as forsterite (see U.S. Pat. No. 3,215,494). The change taking place in the thermal treatment may be illustrated as follows:

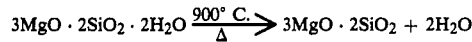

$$3MgO \cdot 2SiO_2 \cdot 2H_2O \xrightarrow[\Delta]{900° C.} 3MgO \cdot 2SiO_2 + 2H_2O$$

It has been found that the decomposition of asbestos tailings to forsterite starts a relatively low temperatures of from 200° to 400° C. but the reaction is very slow. On the other hand, the evolution of water is much faster at higher temperatures such as at from 700° to 900° C. On the other hand, when calcination is carried out at temperatures above 900° C., the removal of water is readily achieved but the calcined product obtained (sometimes referred to as "dead burned") is less reactive with organic resins.

Accordingly, it has been found that a preferred calcined product is one where the heating steps have been carried out at a temperature of from above 800° C. to under 900° C. It has been established that after such a heat treatment there is no chrysotile fiber left in the mineral fiber. It has also been found that the material which has been calcined at temperatures of from above 600° C. to under 1000° C. is more reactive with the organic resins so that a stronger product is obtained. This is contrary to the belief that fibers were essential to provide strength to a shaped product.

It is known that in asbestos tailings which correspond to the formula $3MgO.2SiO_2.2H_2O$ the silica contains hydroxyl groups also known as a silanol surface which can be illustrated as follows:

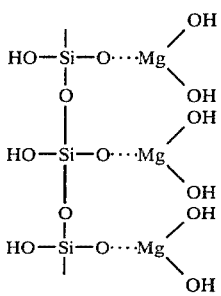

Such silica particles having a silanol surface, i.e. covered with a monolayer of hydroxyl groups may be referred to as hydrated silica or polysilicic acid or polyhydroxy silicates, and thus asbestos tailings are basic in nature.

It is believed that calcination of asbestos tailings induces the formation of anhydrous oxides with the removal of water thus leading to a product which is basic in nature and can be illustrated as follows:

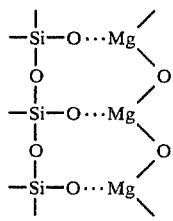

Accordingly, since the hydroxy-containing resins used are acidic in nature, their reaction with the anhydrous oxides or calcined asbestos tailings will lead to the formation of a chemical bond of salt character. The reaction of the organic and the mineral phases will result in a neutral salt, and the reaction can be illustrated as follows:

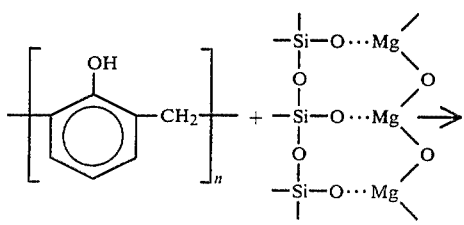

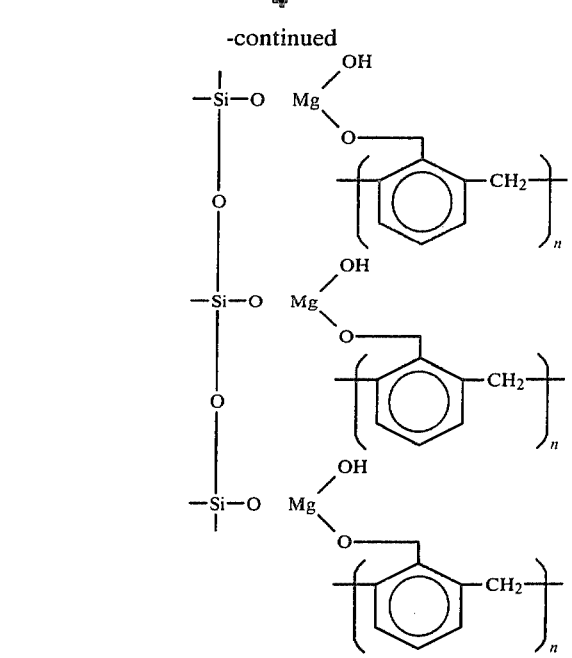

The formation of such a salt is well established the following way. The calcined residues, before compounding with the resin, show definitely a basic character: when suspended in distilled water, the pH goes up to 10.5 within a few minutes. On the other hand, the starting phenolic resin is acidic, as shown by the low pH of its suspension in water: 4.5. But when the compounded material is ground, after reaction, the pH of the suspended material in water varies between 6.9 and 7.1 showing that the acid and base, initially present have neutralized each other.

It will readily be observed that the reaction between the magnesium silicate and the resin in the present invention is a totally different reaction than the reaction of the same resin with a polyhydroxy magnesium silicate. In the latter case, the reaction between the hydroxy group of the resin or polymer occurs with the silanol groups of polyhydroxy magnesium silicate whereas in the present invention, the reaction between the hydroxy-containing polymer occurs with the magnesium oxide group thereby to give a magnesium salt of the resin.

In another aspect of the present invention, there is provided a process for preparing the shaped products of the present invention which comprises mixing calcined chrysotile asbestos tailings having a particle size of from fibrous to −325 mesh with a hydroxy-containing polymer, pouring the mixture in a mold and applying pressure and heat to the mold to induce reaction between the calcined material and the hydroxy-containing polymer is other than an epoxy resin, or applying pressure to the mold at room temperature when the hydroxy-containing polymer is an epoxy resin.

When the hydroxy-containing polymer is a phenol-formaldehyde polymer, a resorcinol-formaldehyde polymer or a phenol-resorcinol-formaldehyde polymer the mold is heated to a temperature of from 100° to 170° C. with temperature within the range of from 135° to 160° C. while a pressure of from 700 to 900 psi is applied to the mold with a pressure of about 800 psi being preferred.

When the hydroxy-containing polymer is an epoxy resin, the molding of the reactants is carried out at room temperature under a pressure within the range of from 50 to 100 psi.

The magnesium silicate used in accordance with the present invention is obtained by the calcination of finely divided hydrous magnesium silicate extending −28 to −325 mesh with a mesh size of from −200 to −325 being preferred. When fibrous hydrous magnesium silicate is used, the size of the fiber should be shorter than Grade 2. As an example of suitable hydrous magnesium silicate which can be used for the purposes of the present invention, there may be mentioned chrysotile asbestos residues or tailings also known as serpentine.

The hydroxy-containing polymers suitable for combining with polyhydroxy silicates may be represented by the general formula:

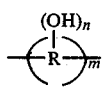

wherein R is a phenol-formaldehyde residue, resorcinol-formaldehyde residue, an epoxy resin residue or a residue of a mixed phenol-resorcinol-formaldehyde resin.

The phenol-formaldehyde polymer may be partially represented by the formula:

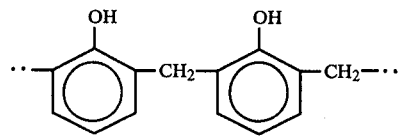

Phenol-formaldehyde resin or polymer is a well known resin which is derived from the condensation of phenol and formaldehyde in alkaline or acid media. This resin is available in liquid or granulated form and both forms are suitable for use in the present invention. As an example there may be mentioned a product sold by Union Carbide & Carbon Corp. under the trademark BRP-4425.

The resorcinol-formaldehyde resin may be partially represented by the formula:

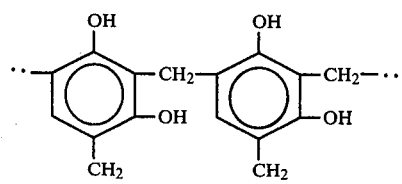

Resorcinol-formaldehyde resin is obtained by the condensation of resorcinol and formaldehyde in alkaline or acid media. As an example of a readily available resorcinol-formaldehyde there may be mentioned Plyophen ® a product manufactured and sold by Reichold Chemical Inc.

The epoxy resins may be represented by the general formula:

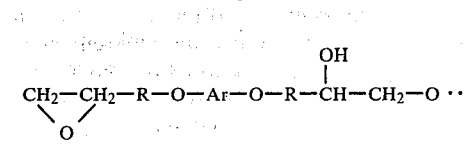

wherein R is an aliphatic divalent radical such as methylene and Ar is an aromatic divalent group such as phenyl. As an example of epoxy resins which may be used, there may be mentioned the EPON ® resins manufactured and sold by Shell Chemical Corp. New York, N.Y.

As stated previously, the essential novel property of the shaped products of the present invention is that they are devoid of fibers and thus they can, after being shaped, be machine-worked without dispersion of any fibers thus rendering such product conform with existing legislations concerning the emission of fibers.

The shaped structures prepared in accordance with the present invention also possess improved mechanical strength and thus providing for the use of lower amounts of resin binder thus decreasing their cost of production.

Furthermore, the compositions of the present invention possess improved properties such as abrasion resistance, flexural strength, tensile strength, impact resistance, resistance to heat distortion and resistance to thermal expansion, resistance to outdoor weathering and electrical insulation capacity by comparison with compositions using conventional clay fillers and other compositions containing non-hydroxy-containing silicates. Furthermore, the compositions of the present invention can be initially formed into a mixture or a slurry and then directly shaped and cured into a final polymerized form, thereby eliminating several processing steps usually required with glass fibers in reinforced compositions. In certain cases it may be desirable to include minor amounts of inorganic fillers where special design effects are desired. As an example there may be mentioned garnet which is a reddish brown, very hard inorganic material which contains surface hydroxyl groups. When coupled with the hydroxy-containing resins there will be obtained a structural material possessing stain resistance and impact strength.

The amount of filler used in the compositions of the present invention can vary over a range of from 90% to 5%. The amount of filler used will depend on the purpose for which the structural material is intended. For example, when it is desired to obtain resistance to mechanical compression the filler will be used preferably in an amount of about 70–90%.

The really unexpected aspect of this invention can be summarized the following way: a serpentinic fibrous material is entirely freed of any asbestos fibers by thermal treatment while offering improved mechanical properties as compounding material with low percentages of binders such as phenolic or epoxy resins. This new approach permits the use of such a mineral in friction material, in fertilizer, as a source of magnesium oxide, or hydroxide or in general in compounding mixtures for plastics and papers where they can be used with great advantages because of their low cost and excellent performances, without the disadvantage caused by the emission of asbestos fibers.

The conservation or improvement of mechanical properties of the molded material when replacing asbestos fibers with calcined tailings is really unexpected in terms of molding technique. If one looks at the patent literature, it is obvious that in order to circumvent the environmental drawbacks of asbestos fibers, considerable amount of work has been devoted to find fibrous substitutes to asbestos. For example, many substitutes have been evaluated in order to replace asbestos in phenolic moldings, such as glass fiber, carbon fiber or organic fibers (Brit. Polym. J., Vol. 2, No. 6, November 1970, p. 270–276; Plast. Technol., Vol. 23, No. 9, August 1977, p. 51–56). Therefore, it is really surprising that a mere thermal treatment, while maintaining or even improving the reactivity of the filler with the resin, gives a product of equal or better mechanical properties without the objectionable presence of fiber.

In fact, the formation of a composite material with calcined tailings and phenolic resins which is truly fiber free goes against the teaching of the literature: it is reported that thermal treatment of the asbestos-phenolic composite does emit fibers. This is clearly demonstrated by a study of Alste, Watson and Bagg (Atmos. Environ., Vol. 10, No. 8, 1976, p. 583–589) who have shown that brake linings, when submitted to high temperature, still emit fibers. It is certainly not obvious that the fact of doing the thermal treatment prior to compounding with the phenolic resin would lead to an asbestos fiber-free product although compounding and thereafter heating were known to give a product emitting fiber upon use.

EXAMPLES

Mixtures of the calcined tailings mesh −200 was used after a one hour treatment at 900° C. The mixture of the calcined tailings (75% by weight) and of the phenol-formaldehyde resin manufactured by Dow and sold under the trade mark TR ® 18176 (25% by weight) was made in a Waring blendor for a duration of five (5) minutes. The molding was done in a 3"×6" mold to give plates ¼" thick. The mold was heated to a temperature of from 135° to 166° C., vented and the pressure was 800 psi. The module of rupture was measured using ASTM procedure No. C-133, part 17. Results are given in Table I. The products of the molding were examined for asbestos fibers content and fiber emissions under abrasion.

Samples of dust were collected on field monitors (MAW PO37AO), 0.8μ pore diameter, at a constant rate of 10 l p.m. The ambient atmosphere was also monitored before and after experiment. The samples were examined at a magnification of 500 using a phase-contrast microscope. Fibers more than 5μ in length and length-breadth were counted. The samples were also examined by electronmicrography. These examinations have shown that the starting serpentine waste was rich in asbestos fibers. After calcination, asbestos fibers were absent from the molding product or from the product prior to molding.

TABLE I

| Example | Mineral | T° Calcination °C. | Resin | Moulding T° | Tensile Modulus psi |
|---|---|---|---|---|---|
| 1a | Serpentine Mesh-200 | 900 | Phenolic Grade 18 | 160 | 3328 |
| 1b | Serpentine Mesh-200 | Not calcined | Phenolic Grade 18 | 160 | 3122 |
| 2a | Serpentine Mesh-200 | 900 | Phenolic Grade 18 | 150 | 3505 |
| 2b | Serpentine Mesh-200 | Not calcined | Phenolic Grade 18 | 150 | 3238 |
| 3a | Serpentine Mesh-200 | 900 | Phenolic Grade 18 | 135 | 2935 |
| 3b | Serpentine Mesh-200 | Not calcined | Phenolic Grade 18 | 135 | 2853 |
| 4a | Serpentine Mesh-325 | 900 | Phenolic Grade 18 | 150 | 3628 |
| 4b | Serpentine Mesh-325 | Not calcined | Phenolic Grade 18 | 150 | 3296 |
| 5a | Serpentine Mesh-200 | 800 | Epoxy | 25 | 3126 |
| 5b | Serpentine Mesh-200 | Not calcined | Epoxy | 25 | 2841 |

By proceeding in the same manner and using a resorcinol-formaldehyde resin or a mixture of resorcinol-formaldehyde and phenol-formaldehyde resin in the place of the phenol-formaldehyde or the epoxy resin, molded products are obtained which contain no asbestos fibers and with comparable physical properties are obtained.

I claim:

1. A shaped structure formed from the reaction of a non fibrous calcined residue of chrysotile asbestos derived from chrysotile asbestos tailings having a particle size extending from fibrous to −325 mesh and a hydroxy-containing polymer selected from the group consisting of a phenol-formaldehyde polymer, a resorcinol-formaldehyde polymer, a phenol-resorcinol-formaldehyde polymer and an epoxy resin, said shaped structure being characterized by the total absence of any fibrous material, the new product representing a characteristic repeating magnesium oxide-resin bond of the formula:

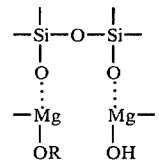

wherein in R is the residue of said hydroxy-containing polymer, the amount of calcined residue of chrysotile asbestos tailings being from 5 to 90% by weight and the amount of polymer being from 90 to 5% by weight.

2. The shaped structure of claim 1, wherein the polymer is a phenol-formaldehyde polymer.

3. The shaped structure of claim 1, wherein the polymer is an epoxy resin.

4. The shaped structure of claim 1, wherein the polymer is a resorcinol-formaldehyde polymer.

5. The shaped structure of claim 1, wherein the polymer is a mixture of phenol-formaldehyde and resorcinol-formaldehyde.

6. A process which comprises calcining chrysotile asbestos tailings having a particle size of from −28 to −325 mesh at a temperature within the range of from 700° to 900° C., mixing the calcined residue with a hydroxy-containing polymer selected from the group consisting of phenol-formaldehyde polymers, resorcinol-formaldehyde polymers, phenol-resorcinol-formaldehyde polymers and epoxy resins, and shaping said reaction mixture in a mold under pressure at a temperature ranging from 100° to 170° C. when the hydroxy-containing polymer is other than an epoxy resin and at room temperature when the hydroxy-containing resin is an epoxy resin.

7. The process of claim 6, which comprises calcining a chrysotile asbestos tailing having a −200 mesh at a temperature of about 900° C., mixing said calcined material with a phenol-formaldehyde resin, shaping the mixture thus obtained in a mold heated to a temperature of from 135° to 160° C. under a pressure of about 800 psi.

8. The process of claim 6, which comprises calcining a chrysotile asbestos tailing having a −200 mesh at a temperature of about 900° C., mixing said calcined material with an epoxy resin, shaping the mixture thus obtained in a mold at room temperature under a pressure of from 50 to 100 psi.

9. A process for preparing a shaped structure which comprises calcining chrysotile asbestos tailings having a particle size of from −28 to −325 mesh thereby to obtain a basic anhydrous oxide of the formula:

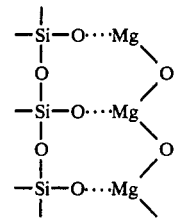

mixing said basic anhydrous oxide with an acidic hydroxy-containing polymer selected from phenol-formaldehyde polymers, resorcinol-formaldehyde polymers, phenol-resorcinol-formaldehyde polymers and epoxy resins, reacting said mixture in a mold at a temperature of from 100° to 170° C. and under a pressure of from 700 to 900 psi when the hydroxy-containing polymer is other than an epoxy resin and at room temperature and a pressure of from 50 to 100 psi when the hydroxy-containing polymer is an epoxy resin whereby there is obtained a shaped structure devoid of any fibrous material and characterized by a repeating unit of magnesium oxide-resin bond of the formula:

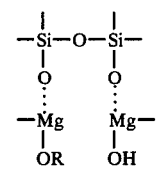

wherein R is the residue of the hydroxy-containing polymer.

* * * * *